Feb. 28, 1967 W. H. SHIRK, JR 3,307,104
DIRECT READING KELVIN BRIDGE INCLUDING
COMPENSATING SLIDEWIRES
Filed Oct. 4, 1963

United States Patent Office 3,307,104
Patented Feb. 28, 1967

3,307,104
DIRECT READING KELVIN BRIDGE INCLUDING COMPENSATING SLIDEWIRES
Wesley H. Shirk, Jr., Ambler, Pa., assignor to Leeds and Northrup Company, Philadelphia, Pa., a corporation of Pennsylvania
Filed Oct. 4, 1963, Ser. No. 313,997
4 Claims. (Cl. 324—62)

This invention relates to measuring networks of the Kelvin double-bridge type particularly suited for precision measurement of unknown low resistance values such as of sample lengths of large conductor cable, meter shunts, low-valued resistors and the like.

In accordance with the invention, the measuring slidewires of a Kelvin bridge are shunted to afford the desired effective slidewire range as introduced into the A and a arms of the bridge and the B and b arms of the bridge are modified to include slidewires ganged with the measuring slidewires and effective to maintain the resistance of the B and b arms constant. With the circuit so modified, the slidewire scale is linear in terms of the known resistance introduced by the slidewire into the A and a arms and with associated decade-resistor dials provides for direct-readout of the digits of the numerical value of the unknown resistance. The linear slidewire also maintains a fixed angular calibration regardless of its actual unshunted value, thus permitting uniformity of slidewire calibration for all instruments incorporating this circuitry.

For a more detailed understanding of the invention, reference is made to the accompanying description of the attached drawings in which.

Figure 1:
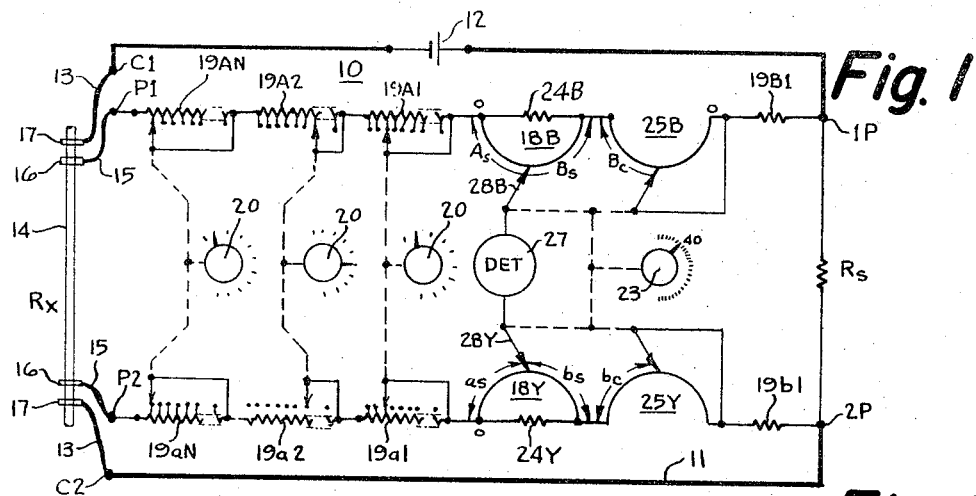
FIG. 1 is exemplary of the basic circuitry of a Kelvin bridge modified to embody the invention.

Referring to FIG. 1, the Kelvin bridge 10 comprises a standard resistor $R_S$ whose terminal 2P is connected to the bridge terminal C2 via the yoke conductor 11. The circuit from the bridge terminal C1 to terminal 1P of the standard resistor $R_S$ includes the battery 12 or equivalent current supply source. The precut current leads 13 from terminals C1, C2 of the bridge may be provided with clamps or clips for connection to a sample of wire or cable 14, or other unknown four-terminal resistance whose resistance $R_X$ is to be measured. The precut potential leads 15 from terminals P1, P2 of the bridge may also be provided with clamps or clips for connection to the sample 14 between the current feed points 17, 17 and with known distance between the potential tap off points 16, 16. The set of so-called battery-ratio or A, B arms of the bridge are connected in series between the potential lead terminal P1 and the upper terminal 1P of the standard resistor $R_S$. The set of so-called yoke ratio or a, b arms of the bridge are connected in series between the potential lead terminal P2 and the lower terminal 2P of the standard resistor $R_S$. With the contact of the measuring slidewire 18B set at the zero end of the slidewire, the resistance of the A arms of the bridge, i.e., from terminal P1 to that slidewire is determined by the settings of the stepped or decade resistors 19A1 to 19AN. Similarly, with the contact of the measuring slidewire 18Y set at the zero end of that slidewire, the resistance of the a arm of the bridge, i.e., from terminal P2 to the slidewire is determined by the settings of the stepped or decade resistors 19a1 to 19aN.

The aforesaid resistances of the A and a ratio arms are paired and the adjustable elements of each pair are ganged for concurrent adjustment by the corresponding one of knobs or dials 20 each associated with a scale or index indicating the decimal value introduced by the corresponding pairs of resistors respectively in the A and a arms. With the slidewires 18B, 18Y displaced from their zero settings, as above defined, the resistance of the A and a arms of the bridge respectively additionally include the resistance values As, as indicated in FIG. 1. It is to be noted that the slidewires 18B, 18Y are respectively shunted by resistors 24B, 24Y and consequently the aforesaid resistance values are a fractional part of that of the associated shunted slidewire as determined by the setting of the slidewire contact 28B or 28Y.

The measuring or balancing slidewires 18B, 18Y are respectively ganged with the corresponding slidewires 25B, 25Y. With the balancing slidewires 18B, 18Y set to introduce their maximum resistance values into the A and a arms of the bridge, the resistance value of the B arm of the bridge (between slidewire 18B and terminal 1P) is equal to the sum of the values of fixed resistor 19B1 and the maximum value of slidewire 25B; and the resistance value of the b arm of the bridge (between slidewire 18Y and the bridge terminal 2P) is equal to the sum of the values of the fixed resistor 19b1 and the maximum value of slidewire 25Y. Each of the slidewires 25B, 25Y provides equal incremental change of resistance for equal change in position of their adjustable elements. The maximum value of each of slidewires 25B, 25Y is equal to the maximum shunted value of the shunted slidewires 18B, 18Y. Consequently, when the balancing slidewires 18B, 18Y are displaced from their maximum settings, their effective resistance values Bs, bs respectively introduced into the B and b arms of the bridge are offset or compensated by the equal reduction of the effective resistance values Bc, bc of the slidewires 25B, 25Y. In short, for all positions of the common operating knob or dial 23 of the slidewires 18B, 18Y, 25B, 25Y, the resistance values of the B and b arms of the bridge remain fixed and equal to each other. Balance of the bridge is indicated when there is null response of the detector 27 connected between the contacts 28B, 28Y of the measuring slidewires 18B, 18Y. The detector 27 may be a galvanometer or an electronic amplifier having a center-zero scale meter or equivalent in its output circuit. The equation for balance of the bridge is $$R_X = R_S(A/B)$$

where

B is the resistance value of battery fixed ratio arm,
A is the effective value of the yoke adjustable ratio arm, and
$R_S$ is the fixed standard.

As is true of all Kelvin type bridges, the ratio of the A/B must be equal to the ratio of a/b to within the required accuracy and the yoke 11 is of as low resistance as practical.

The inclusion of the compensating slidewires 25B, 25Y in the B and b arms of the bridge permits shunting of the measuring slidewires to any desired value while retaining linearity of the slidewire scale and so makes possible the use of a linear, precalibrated, printed scale. This provides for direct reading of the unknown resistance directly from the decimal settings of the step resistors and of the linear scale associated with the slidewire dial 23.

In explanation of this point, let it be assumed that the constant value of arms B and b as maintained by the compensating slidewires is 10,000 ohms, that at balance of the bridge, the common setting of the step resistance 19A2, 19a2 is 6 (corresponding with a resistance value of 600), that the common setting of step resistance 19A1, 19a1 is 2 (corresponding with a resistance value of 20), and that the common setting of slidewires 18B, 18Y, 25B, 25Y is 45 (corresponding with a resistance value of 4.5 ohms). If such balance is obtained with a standard resistance $R_S$ of 0.1 ohm, the value of the unknown resistance is 0.06245 ohm; with the standard resistance $R_S$ of 1 ohm, the same balance setting would correspond with 0.62245 ohm as the value of $R_X$.

Figure 2:
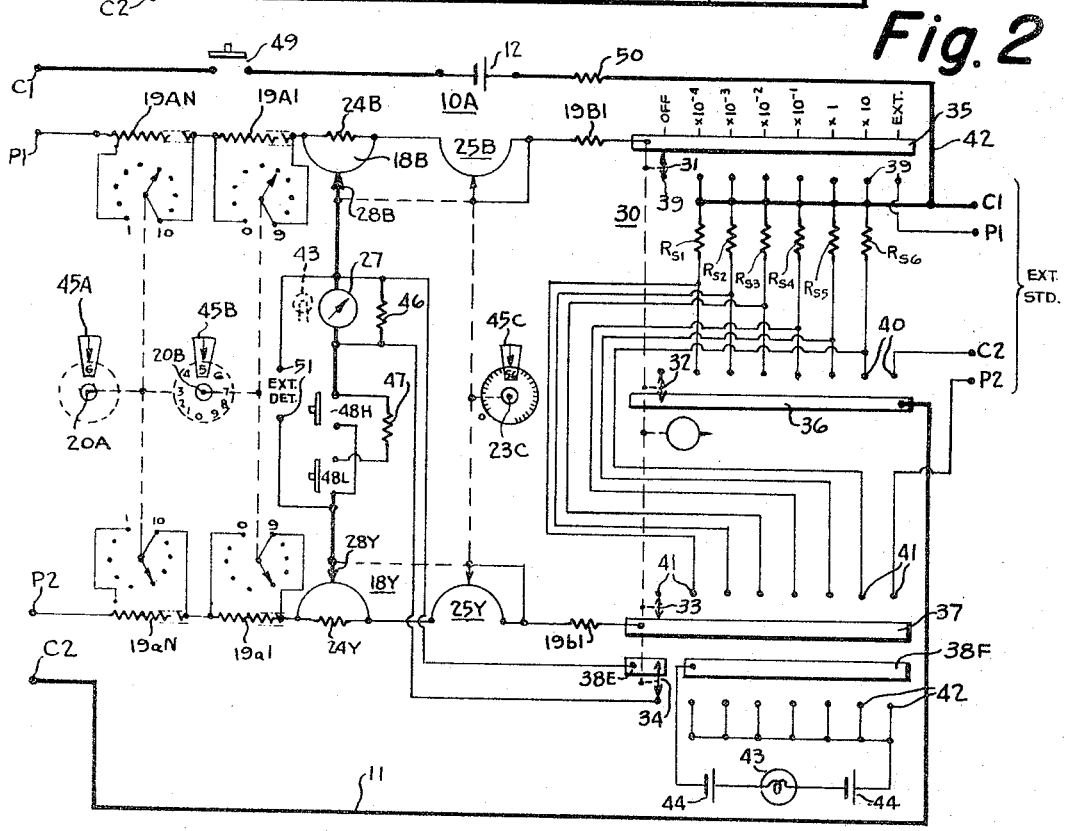
FIG. 2 is a schematic of the preferred circuitry of a Kelvin bridge unit incorporating the invention.
Figure 3:
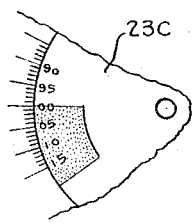
FIG. 3 is a fragmentary portion of the slidewire dial of FIG. 2.

The Kelvin bridge unit 10A of FIG. 2 now described is provided with a multi-position, multi-contact switch 30 for selecting any one of standard resistances $R_{S1}$-$R_{S6}$ for inclusion in the bridge circuit and the notation for each switch position serves as a decimal multiplier for the balance readings of the resistance dials. The movable contact 31 of switch 30 is in continuous engagement with the associated ring contact 35 and selectively engages the contacts of the first bank 39 for successive positions of the switch. Similarly, the movable contacts 32, 33 of switch 30 are respectively in continuous engagement with the corresponding ring contacts 36, 37, and for the successive positions of the switch selectively engage the contacts of the second and third banks 40, 41.

With switch 30 in the OFF position indicated, none of the standard resistors is included in the bridge circuit. With the switch in the next or #2 position, its contacts 32 and 33 connect the lower end of standard resistor $R_{S1}$ both to the yoke conductor 33 and the $b$ arm resistor 19$b$1 and its contact 31 completes a connection to the upper end of resistor $R_{S1}$ and to the source conductor 42. In like manner, for each of the #3 to #7 positions of switch 30, its ganged contacts 31–33 similarly connect a corresponding one of the standard resistors $R_{S2}$-$R_{S6}$ into the bridge circuit. By way of example, the values of the standard resistors $R_{S1}$-$R_{S6}$ may be respectively 0.01, 0.1, 1, 10, 100 and 1000 ohms. For the #8 position of switch 30, the contacts 31 to 33 engage the last contacts of the banks 39, 40, 41. Similarly, to connect into the bridge circuit, an external standard resistor (not shown) is connected to the bridge terminals C1, P1, C2, P2.

The movable contact 34 of switch 30 is ganged with its standard-resistor selector contacts 31–33. For the OFF position of switch 30, contact 31 bridges the first contact of bank 42 and the short ring contact segment 38E to provide a very low resistance shunt for the galvanometer 27. In consequence, the galvanometer coil is strongly damped and the galvanometer pointer and coil suspension are protected against damage incident to handling of the bridge unit. For each of the other positions of switch 30, the contact 34 bridges the long ring segment 38F and a corresponding one of the remaining contacts of bank 42 to complete a galvanometer illuminating circuit including the lamp 43 and a current source exemplified by batteries 44.

To provide a decimal readout to four significant figures, the bridge of FIG. 2 includes in each of the A and $a$ arms two tapped resistors each controlled by a decade switch coupled to the corresponding decade switch of the similar resistor in the other ratio arm. Specifically, each of the pair of resistors 19A1, 19$a$1 may have a total value of 90 ohms with 10-ohm taps connected to the decade switch. The associated dial 20B for readout of the third place digit has 10 positions marked 0 to 9 and in turn visible through the associated panel window 45B. Each of the pair of resistors 19AN, 19$a$N may have a total value of 1000 ohms with 100-ohm taps (from 100 to 1000 ohms) connected to its decade switch. The associated dial 20A, for readout of the fourth place digit, has 10 positions marked 1. to 10. (note decimal point in turn visible through the associated panel window 45A). The balancing slidewires 18B, 18Y as shunted by their respective shunt resistors 24B, 24Y each has a maximum value of 11.500 ohms. The 00 (white background) calibration of the slidewire scale 23C (FIG. 2) corresponds with that position of contacts 28B, 28Y for which the shunted slidewires 18B, 18Y respectively introduced 0.25 ohm into the A and $a$ arms of the bridge.

The first steps of decade switch 19AN and 19$a$N are therefore 99.75 ohms so that the total resistance of the A arm with the first dial in position #1 and the remaining dials on zero is exactly 100 ohms. For this same setting of dial 23C, the compensating slidewires 25B, 25Y, each having a total value of 11.500 ohms, respectively effectively subtract 11.250 ohms from the B and $b$ arms of the bridge so to offset the 11.250 ohms introduced into those arms by the balancing slidewires 18B, 18Y. For positions of the slidewires corresponding with increasingly higher resistance of the A and $a$ arms (i.e., from 0.25 to 10.25 ohms), the scale calibrations increase linearly from 00 to 100. For reasons which later appear clear, these calibrations may be black on a white background. For positions of the slidewire corresponding with increasingly higher resistance of the A and $a$ arms (i.e., from 10.25 to 11.25 ohms), the scale calibrations increase linearly in direction from 00 to 10. These latter scale calibrations may be white on a black background. It may here be noted that when the scale reading is within the 10% black background range, the setting of dial 20B should be increased by one before multiplication of the readout by the setting of switch 30.

With switch 30 in any of #2 to #8 positions, its contact 34 is disengaged from the short ring segment 38E, leaving the galvanometer 27 shunted only by its critical damping resistor 46. With the normally open key 48L closed, the galvanometer 27 is connected via resistor 47 between the contacts 28B, 28Y of the balancing slidewires 18B, 18Y and so is responsive, at low sensitivity, to any unbalance of the bridge. With the normally open key or switch 48H closed, the galvanometer is connected directly between the slidewire contacts 28B, 28Y for high sensitivity to any bridge unbalance. The normally open battery key or switch 49 when closed supplies current from the battery to the bridge, assuming, of course, that the multiplier switch 30 is not in the OFF position and that as in FIG. 1 the bridge terminals C1, P1, P2, C2 are connected to the unknown resistance.

Before making any measurements, the mechanical zero of the galvanometer 27 should be checked by observing the position of its light beam or equivalent pointer with switch 30 in its #2 position and all switches 48H, 48L and 49 open. If the pointer does not then indicate zero, its suspension is adjusted in the usual manner. To measure the value of an unknown resistance with the bridge unit of FIG. 2, the resistance is connected to the bridge as described in FIG. 1. With the switch 30 set to the #2 position, the dials 20A, 20B and 23C set for a readout of 10.000 and the key 48L locked down or closed, the battery key 49 is tapped and the sense of the galvanometer deflection noted. The switch 30 is then advanced one step at a time toward the #7 position, tapping the battery key 49 after each step until the direction of the galvanometer reflection reverses. If there is no reverse deflection, the resistance of the unknown is outside of the measuring range afforded by the internal standard resistors $R_{S1}$-$R_{S6}$ and a suitable four-terminal external resistor should be connected to the terminals C1, P1, C2, P2 of the bridge as later discussed.

Assuming the deflection does reverse with the switch 30 advanced to one of the positions #3 to #7, it is stepped back one position and then the dial 20A is advanced one position at a time, tapping the battery key 49 after each step until the galvanometer deflection reverses. The dial 20A is then stepped back one position and dial 20B advanced one step at a time, tapping key 49 after each step until the galvanometer deflection reverses. Dial 20B is then stepped back one position and the slidewire dial 23 smoothly advanced while the key 49 is repeatedly tapped to check for a galvanometer deflection until the deflection is very small or zero. Then with the low-sensitivity key 48L unlocked and the high-sensitivity key 48H locked in closed-circuit position, the slidewire dial 23C is slowly rotated until the galvanometer deflection, as checked by repeated tapping of the battery key 49, is zero.

With the bridge so balanced, the digital readout of the dials 20A, 20B and 23C are multiplied by the factor represented by the position of switch 30. For example, if the readings of dials 20A, 20B, 23C are respectively 6, 5 and 55 (white scale background) and switch 30 is in the #4 position corresponding with a multiplier $10^{-2}$, the value of the unknown resistance is 0.06555 ohm. As another example, if the readings of dials 20A, 20B, 23C at balance are respectively 6., 5 and 05 (black scale background) and with switch 30 in the #4 position, the value of the unknown resistance is 0.6605.

If the approximate value of the unknown resistance is known, the number of balancing steps may, of course, be reduced. For example, if the approximate value is known to be about 0.065 ohm, the dials 20A, 20B, 23C would initially be set to 6., 0 and 00 with switch 30 in its #4 position. The course of final balancing would then proceed from this point in the manner above described. With the six values of internal resistance given above, the total range of measurement of $R_X$ is from 0.0001 ohm to 110.1 ohms. as indicated in Table A below.

TABLE A

| $R_S$ | $R_X$ |
| --- | --- |
| Ohms | Ohms |
| 0.01 | .0001–.001 |
| 0.1 | .001–.01 |
| 1.0 | .01–.1 |
| 10.0 | .1–1.0 |
| 100.0 | 1–10.0 |
| 1,000.0 | 10–110.1 |

To extend the upper limit of measurement to 1000 ohms, an external standard resistor of 10,000 ohms is connected to the External Standard C1, P1, C2, P2 terminals of the bridge and the switch 30 is set in the #8 position. The current source may be a 1.5-volt battery as before, or it may be replaced with an external source of up to 30 volts.

To extend the lower limit for measurement of $R_X$ in the range of 0.00001 to 0.0001 ohm, an external standard resistor of 0.001 ohm is similarly connected for balancing with switch 30 in the #8 position. Further to extend the lower limit for measurement of $R_X$ in the range of 0.000001 to 0.00001 ohm, an external standard resistor of 0.0001 ohm is similarly connected for balancing with switch 30 in the #8 position. For these two lower extended ranges, the internal battery 12 is replaced by an external 1.5-volt battery in series with an external current-limiting resistor of say about 0.075 ohm. When using an external battery, it is connected in series with a battery switch and a current-limiting resistor between terminals C1, C1. Under these conditions, the internal battery key 12 must be kept in open-circuit position. Also for these two extended ranges, an external detector, such as the Type 9834 D.C. null detector manufactured by Leeds and Northrup Company, may be connected to the external detector 51, 51 of the bridge unit.

In such case, both of the galvanometer keys 48H, 48L may be left open during the course of final balancing steps.

Another method used to extend the upper range of the bridge described is to connect a fixed standard resistor across the "Unknown" C1, P1, P2, C2 binding posts. For example, if a 100 ohm standard is so connected and the "External Standard" posts are connected to the unknown resistance, the bridge will measure its value (in the range of 1000 ohms to 10,000 ohms for the 100-ohm standard) in terms of conductance. The balance equation for the bridge as used in this manner is $R_X$ = value of standard $\times 10^2$/dial reading of bridge or in terms of D.C. conductance $G_X$ = dial reading of bridge/value of standard $\times 10^2$ Specific examples are given in Table B below:

TABLE B

| Value of Standard | "X" | Bridge Dial Reading |
| --- | --- | --- |
| 100 | 1,000 | 10.000 |
| 100 | 5,000 | 2.000 |
| 100 | 10,000 | 1.000 |
| 1,000 | 25,000 | 4.000 |
| 1,000 | 12,500 | 8.000 |
| 10,000 | 111,111 | 9.000 |
| 1 meg | 100 meg | 1.000 |

The advantage of having the maximum effective values of the balancing slidewires and the compensating slidewires equal to 110% of the individual steps of the first decade resistors 19A1, 19a1 is that the position of final balance is always certain to be intermediate the ends of the slidewire scale. This avoids need for resetting of the decade dials if the value of the unknown is close to the 10 ohm end of the slidewire dial. For example, with the balancing slidewires and the compensating slidewires having a maximum value equal to one step of resistors 19A1, 19a1 (as in FIG. 1), it would require resetting of dials from a readout of 6001 to 5999 with certainty to determine the coil balance readout should be 6000. With the slidewire range of 110%, as in FIG. 2, with the settings of either 6.0 or 5.9 for the decade dials 20A, 20B, the true balance would be definitely ascertained merely by adjusting the slidewire dial 23C within the black and white 10% ranges on either side of the 00 (10-ohm) calibration of dial 23C. The invention is not limited, however, to the use of the 110% slidewires, as in FIG. 2, but comprehends also the 100% slidewires of FIG. 1.

What is claimed is:
1. A Kelvin bridge comprising
   two pairs of ratio arms, each pair of said arms including a measuring slidewire adjustable to increase the resistance of one ratio arm of that pair concurrently with decrease in resistance of the other ratio arm of that pair,
   two resistors each respectively connected in shunt to a corresponding one of said measuring slidewires,
   linearly calibrated dial means associated with the adjustable elements of said measuring slidewires, and
   two compensating slidewires respectively in one ratio arm of each of said pairs of ratio arms and connected for inverse adjustment concurrently with the corresponding measuring slidewire to maintain constancy of the resistance of said one ratio arm.
2. A direct-reading Kelvin bridge comprising
   a first set of tapped resistors included in series in the A arm of the bridge, each for adjustment of its resistance value in ten discrete integer steps,
   a second set of tapped resistors included in series in the $a$ arm of the bridge, each for adjustment of its resistance value in ten discrete integer steps,
   readout dials each associated with a corresponding pair of said tapped resistors and indicating the integer decimal-place value of the resistance introduced by them in the A and $a$ arms of the bridge,
   two measuring slidewires respectively in series with sets of tapped resistors progressively to introduce resistance in the A and $a$ arms of the bridge with complemental reduction of resistance in the B and $b$ arms of the bridge,
   two compensating slidewires respectively in the B and $b$ arms of the bridge connected in series with the associated measuring slidewire and ganged therewith to maintain constancy of the resistance of the B and $b$ arms, and
   a readout dial associated with said measuring slidewires and linearly calibrated in terms of resistance introduced in the A and $a$ arms.
3. A Kelvin bridge having two measuring slidewires, each adjustable complementarily to vary its resistance values respectively included in a corresponding pair of ratio arms of the bridge, characterized in that each of the two measuring slidewires is shunted by a resistance means, that the bridge includes two linear compensating slidewires, each wholly in one of the ratio arms of the corresponding pair of ratio arms and having a maximum resistance equal to the maximum effective value of the shunted measuring slidewire included in that pair of ratio arms, and that said compensating slidewires are ganged to said measuring slidewires for inverse adjustment so that each compensating slidewire maintains constancy of the total resistance of said one arm of the corresponding pair of ratio arms throughout the range for which the corresponding measuring slidewire is adjustable to vary the resistance of the other ratio arm of that pair of ratio arms.

4. A Kelvin bridge having two measuring slidewires, each adjustable complementarily to vary its resistance values respectively included in a corresponding pair of ratio arms of the bridge, characterized in that the bridge includes two linear compensating slidewires, each included in one only of the ratio arms of the corresponding pair of ratio arms and having a maximum resistance equal to the maximum effective value of the measuring slidewire included in that pair of ratio arms, and that said compensating slidewires are ganged to said measuring slidewires for inverse adjustment so that each compensating slidewire maintains constancy of the total resistance of said one arm of the corresponding pair of ratio arms throughout the range for which the corresponding measuring slidewire is adjustable to vary the resistance of the other ratio arm of that pair of ratio arms.

References Cited by the Examiner
UNITED STATES PATENTS 2,648,819  8/1953  Gustafsson _____ 324—62

OTHER REFERENCES

"A Method of Controlling the Effect of Resistance in the Link Circuit of the Thomson or Kelvin Double Bridge," by Ramaley, Journal of Research of The National Bureau of Standards, vol. 64c, No. 4, October–December 1960.

WALTER L. CARLSON, *Primary Examiner.*

W. H. BUCKLER, E. E. KUBASIEWICZ,
*Assistant Examiners.*

UNITED STATES PATENT OFFICE
CERTIFICATE OF CORRECTION

Patent No. 3,307,104                 February 28, 1967

Wesley H. Shirk, Jr.

It is hereby certified that error appears in the above numbered patent requiring correction and that the said Letters Patent should read as corrected below.

Column 2, line 70, for "resistance" read -- resistances --; column 5, line 13, for "0.6605" read -- 0.06605 --.

Signed and sealed this 22nd day of October 1968.

(SEAL)
Attest:

Edward M. Fletcher, Jr.

Attesting Officer

EDWARD J. BRENNER

Commissioner of Patents